April 18, 1939.     W. L. GILL     2,154,841

ELECTRIC STORAGE BATTERY

Filed April 14, 1937

Inventor
Walter L. Gill
By Shepherd Campbell
Attorneys

Patented Apr. 18, 1939

2,154,841

UNITED STATES PATENT OFFICE 2,154,841

ELECTRIC STORAGE BATTERY

Walter Lawrence Gill, Redlands, Calif.

Application April 14, 1937, Serial No. 136,936

3 Claims. (Cl. 136—81)

This invention relates to electric storage batteries, adapted for use in any relation where storage batteries are commonly employed, but particularly adapted to yield a high degree of efficiency and exceedingly long life under the shock and jar incident to the use of batteries upon automobiles and other motor vehicles.

Broadly speaking, the invention resides in substantially suspending the battery plates in supporting elements of live rubber, so that they are cushioned against shock and jar at every point. The invention also contemplates the use of a battery with a much larger number of plates than has commonly been employed, with a corresponding reduction in area for each plate but with a corresponding increase in thickness of the individual plates. Thus, the increased number of plates, each of increased strength, yields a very powerful battery and one of very long life.

The invention will be best understood by reference to the accompanying drawing, wherein.

Like numerals designate corresponding parts throughout the several figures of the drawing.

Figures 1, 2:
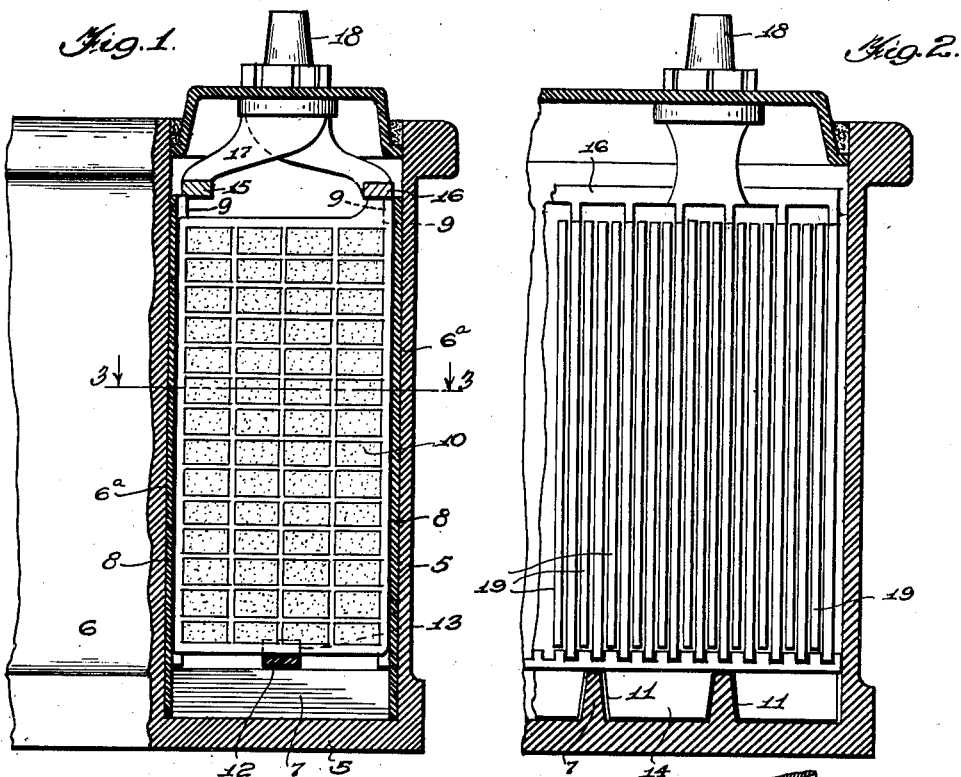
Figure 1 is a transverse vertical section through one of the cells of a battery.
Fig. 2 is a fragmentary longitudinal sectional view through said cell.
Figure 3:
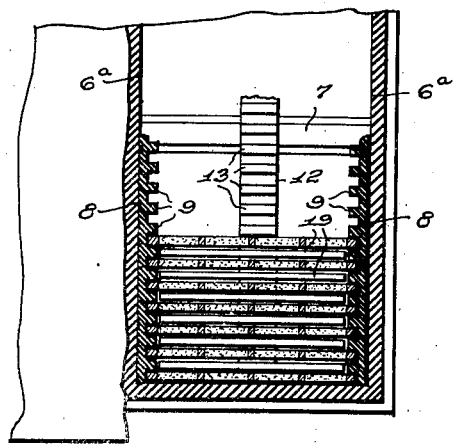
Fig. 3 is a horizontal sectional view upon line 3—3 of Fig. 1.
Figure 4:
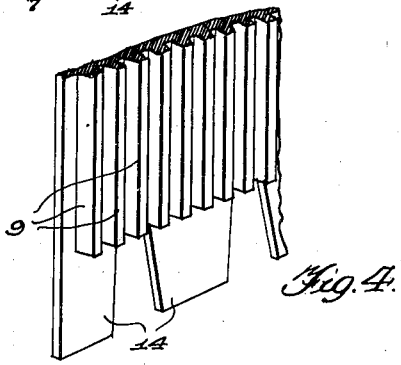
Fig. 4 is a detail view of the side plate of live rubber, hereinafter described.
Figure 5:
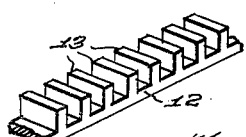
Fig. 5 is a detail view of one of the live rubber cushioning and spacing elements hereinafter described.

In the drawing, 5 designates a conventional battery container divided into a plurality of compartments 6, constituting the several cells of the battery. These compartments extend across the container 5, and since the construction of the several cells is identical, only one of them has been illustrated in detail. The side walls 6a of the several cells are smooth, and this makes for ease and economy in the manufacture of the container 5.

Upstanding ribs or bridges 7, disposed at intervals, extend across the bottoms of the several cells and constitute integral parts of the container 5. Live rubber spacing and cushioning plates, comprising the webs 8 and spaced ribs 9, extend along each side of the cells 6 and the grooves between the ribs 9 receive the side edges of the battery plates 10.

The webs 8 are notched out, as indicated at 11, to fit over the bridges 7. A bottom cushioning and spacing element of live rubber comprises a horizontal strip 12 and upstanding ribs 13, which enter between and aid in spacing the lower edges of the plates from each other. This cushioning strip rests upon the tops of the bridges 7.

The webs 8 are held against downward movement either by their engagement with the bridges 7 or by the contact of their lower portions 14 with the bottom of the container, and their ribs 9 extend upwardly to and underlie the plate straps 15 and 16, it being understood that alternate plates are connected to these straps in the conventional way and that these straps are in turn connected by members 17 with the binding posts 18 (only one of which is shown) in the usual way.

The plates are formed in the conventional manner by applying a suitable lead paste to a grid depending from the plate straps 15 or 16, as the case may be, and to aid in maintaining this paste, which constitutes the active element of the battery, retainers 19 are floatingly disposed between opposed plates. These retainers are merely small plates of wood, preferably vertically ribbed upon one face.

These retainers may be made of rubber, composition, or any other suitable material, and they are not employed for purposes of insulation nor depended upon to separate the plates; therefore, they do not have to fit with great exactitude between the plates. They are employed, as previously stated, to aid in supporting the active material and to hold this material against accidental dislodgement from the grids of the plates.

The spacing and supporting of the plates is effected at the sides by the ribbed elements of live rubber and at the bottom by the ribbed strip of live rubber. This, in conjunction with the fact that the tops of the ribs 9 underlie and support the plate straps, results in nesting and suspending the plates in a bed of live rubber, and this in turn provides a shock absorbing construction by which the shock and jar customarily imposed upon the plates of automobile batteries is completely absorbed and eliminated as far as the plates are concerned. The rubber of parts 8 and 9 is pliable and elastic and is not attached to the sides 6a of the compartments 6.

I am aware of the fact that battery jars or containers have been provided made of hard rubber and having ribs and grooves along their edges for the reception of the edges of the plates making up the active elements of the battery cells. However, hard rubber is no more shock absorbing than any other material would be.

By virtue of the arrangement herein shown and described, I not only get rid of the expense of providing ribs along the walls of the main battery container, but I substitute for these ribs a separately formed and consequently more economical element which has a shock absorbing capacity neither contemplated nor present in the hard rubber battery constructions heretofore proposed.

In the conventional type battery, it is usually customary to employ plates of relatively large area extending in the direction of the length of the battery cells. Under my arrangement, the plates are made narrower and are disposed crosswise of the individual cell compartments. Thus, I am able to employ as many plates as may be received within the length of the cell compartments, whereas under the conventional arrangement, it is possible to employ only as many plates as may be received within the width of the battery compartments.

I make my plates correspondingly thicker and thereby gain increased strength, power and life for the battery, and I support the free edges of these relatively narrow plates throughout their entire height by live rubber cushions. It is clear that a narrow plate, supported along its edges, is more effectively braced and supported than a wider plate would be, because the points of support are so much closer to each other.

I take advantage of these same closely related supporting elements to suspend and cushion the plates in the manner described. The result has been to produce a battery that is outstanding in capacity, strength, performance and long life. Many hundreds of these batteries have been manufactured and are in actual use and are yielding results far superior to the batteries heretofore employed. It should be noted that the proposed arrangement permits the employment of the conventional type of exterior container 5, such as are used by other battery manufacturers and which are adapted to be received in the standard battery receptacles of all makes of automobiles.

It is a well known fact that in many relations, a large number of small elements brought into interlocked or knit relationship yields a stronger and more durable construction than a smaller number of larger elements. For example, in the construction of bridge cables, the use of many smaller wires spun into a large cable is found to yield a stronger construction than a smaller number of large wires.

In like manner, the interknit arrangement of a large number of narrow plates complementally cushioned along their edges is found to yield the maximum durability, because there is not such a span between the points of support as to permit of any such degree of vibration at the centers of the plates as would tend to dislodge the active elements, paste, from the plate grids.

It is to be understood that the invention is not limited to the precise construction set forth, but that it includes within its purview whatever changes fairly come within either the terms or the spirit of the appended claims.

Having described my invention, what I claim is:

1. In a battery construction, a container of rigid material having an electrolyte cell compartment formed therein of materially greater height than width, having smooth side walls, a pair of groups of telescoping positive and negative plates disposed crosswise of the electrolyte cell and a connecting strap for each group of plates, said straps extending longitudinally of the cell adjacent the top thereof and the respective groups of plates being attached to said straps, a pair of separate and independent spacing and supporting elements for the plates, each of which comprises a flat web of live rubber adapted to lie against and cover one side only of the electrolyte cell, and each of said webs carrying a plurality of integral live rubber ribs which enter between the said plates and support said plates substantially throughout their height, the upper ends of said live rubber ribs bearing against and cushioning the plate straps, the lower ends of the live rubber webs engaging a part of the battery cell to resist downward movement of said web and the ribs carried thereby, whereby the plates are insulated from each other and yieldingly cushioned throughout their height and suspended through the medium of the straps upon a live rubber cushion.

2. A structure as recited in claim 1, wherein the electrolyte cell is provided with a plurality of transverse upstanding bridges in its bottom, the lower portions of the live rubber webs being notched out for the reception of said bridges, so that the lower portions of the webs may be supported upon the bottom of the cell to thereby resist downward movement of the live rubber webs and consequently to resist downward movement of the plates and straps.

3. In a battery construction, a container of rigid material having an electrolyte cell compartment formed therein of materially greater height than width, having smooth side walls, a pair of groups of telescoping positive and negative plates disposed crosswise of the electrolyte cell and a connecting strap for each group of plates, said straps extending longitudinally of the cell adjacent the top thereof and the respective groups of plates being attached to said straps, a pair of separate and independent spacing and supporting elements for the plates, each of which comprises a flat web of live rubber adapted to lie against and cover one side only of the electrolyte cell, and each of said webs carrying a plurality of integral live rubber ribs which enter between the said plates and support said plates substantially throughout their height, the upper ends of said live rubber ribs bearing against and cushioning the plate straps, the lower ends of the live rubber webs engaging a part of the battery cell to resist downward movement of said web and the ribs carried thereby, whereby the plates are insulated from each other and yieldingly cushioned throughout their height and suspended through the medium of the straps upon a live rubber cushion, said electrolyte cell being provided with a plurality of transverse upstanding bridges in its bottom, the lower portions of the live rubber webs being notched out for the reception of said bridges, so that the lower portions of the webs may be supported upon the bottom of the cell to thereby resist downward movement of the live rubber webs and consequently to resist downward movement of the plates and straps, a relatively narrow live rubber strip extending longitudinally of the cell and resting upon the tops of said bridges and provided upon its upper face with a plurality of spaced ribs, between which the lower edges of said plates are received and by which the lower edges of the plates are cushioned and held in spaced relation to each other.

WALTER LAWRENCE GILL.